March 16, 1965   L. NAVIAS   3,173,779
SEALING AND COATING GLAZE
Filed Dec. 16, 1959
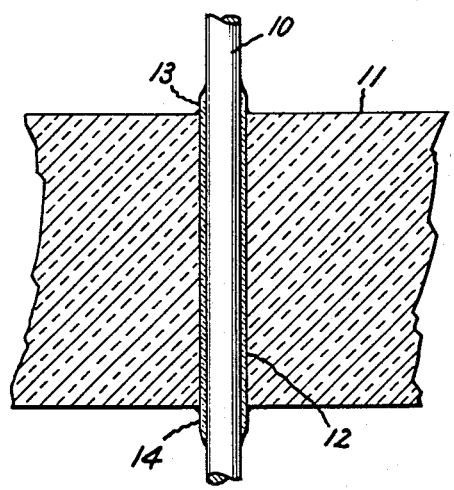
Inventor:
Louis Navias,
by James J Lichiello
His Attorney.

United States Patent Office 3,173,779
Patented Mar. 16, 1965

3,173,779
SEALING AND COATING GLAZE
Louis Navias, Schenectady, N.Y., assignor to General Electric Company, a corporation of New York
Filed Dec. 16, 1959, Ser. No. 859,941
8 Claims. (Cl. 65—43)

This application relates to a glaze for sealing and bonding and, more particularly, to a glass composition employed as a coating on various metals and ceramics or as a metal to ceramic or metal to glass seals.

The aforementioned coatings and seals have found wide application in modern technology with particular respect in, one instance, to electrical discharge or vacuum tubes comprising a sealed glass envelope through which must pass a metal conductor. The problem of providing a seal between the metal conductor and the glass envelope has been a difficult one since most seals are subjected to failures because of temperature differentials, vibration, and attack by the gases within the tube. It is furthermore difficult to provide a particular glass composition which will adhere tightly to a metal surface, particularly, where the coefficient of expansion is quite different for the metal. A satisfactory glass composition which will provide such a seal is correspondingly of high value when utilized as a glaze coating upon a given surface where the surface may be exposed to the same parameters which render the tube sealing operation difficult, i.e. vibrations, reaction with the gases, temperature differentials and various other conditions. U.S. Letters Patent 2,934,667, which is entitled "Controlled Resistivity Glaze for Ignitor Plugs," issued on April 26, 1960, and is assigned to the same assignee as the present application.

Accordingly, it is an object of this invention to provide an improved glass seal.

It is another object of this invention to provide an improved glass bond.

It is another object of this invention to provide a glass seal or bond having a low coefficient of expansion.

It is another object of this invention to provide a glass coating, seal or bond having matching expansion characteristics with various metals and non-metals.

It is another object of this invention to provide a seal or coating which will not bubble when heated in a vacuum.

It is another object of this invention to provide a metal to glass seal which is resistant to attack by such gases as cesium vapor.

Briefly described, this invention contemplates in its broader form the use of a glass taken from the $BaO$—$Al_2O_3$—$SiO_2$ ternary system together with added $B_2O_3$ and utilized as a high temperature seal, bond or coating material.

Various attempts have been made in the past to substitute cesium for mercury in gas filled tubes, since the low ionization potential of cesium (about ⅓ that of mercury) gave promise of a tube with lower arc drop and higher efficiency. Studies also indicated that such a tube should possess the additional advantages of long life, high current carrying capacity, small size and ruggedness. The principal deterrent to the realization of these goals has been the high chemical activity of cesium metal or vapor. At even moderate temperatures cesium vapor vigorously attacks the usual tube materials and causes failure in several different ways, for example, by destruction of the bond between the metal electrodes and the insulating parts of the tube, development of excessive leakage across the insulators, or corrosion of metal parts. Of these problems, the destruction of the bond through reduction by the cesium vapor of the metal oxides generally vital to the common glass to metal seal, has been the most serious factor in the development of cesium vapor tubes. Substitution of oxides and ceramics of high stability such as $Al_2O_3$ and $MgO$ has previously been considered but has been limited in that no satisfactory technique was available for making a vacuum tight seal between these ceramics and the metallic parts of the tube. In addition to providing a vacuum tight seal or bond between the metal and the ceramic, there is an additional problem of expansion match. Unless the metal and the ceramics show closely matching curves of thermal expansion from sealing temperatures of about 1000° C. to room temperature, the result will be a highly stressed or cracked seal. Unfortunately, few metals or alloys are known which give this close match with the relatively low expansion ceramics over such a large range of temperature.

It has been discovered that glasses taken from the $BaO$—$Al_2O_3$—$SiO_2$ ternary system with added $B_2O_3$ overcome the important problem of attack by cesium vapor and that such glasses are highly resistant to attack over long periods of time. Furthermore, various compositions of this glass with or without other additives may match various combinations of ceramics and metals in coefficient of expansion. It became a problem, however, in the use of such a glass for a metal to ceramic seal in that the bond was greatly affected by oxides between the surfaces to be bonded. In this respect, it was further discovered that a good bond was obtained, for example, between a molybdenum metal and an alumina ceramic using a glass or glaze from the aforementioned ternary system where the bonding process included heating in the neighborhood of about 1000° C. in a vacuum, an inert atmosphere or a reducing atmosphere, such as hydrogen, in the presence of cesium. Since an insulator must have a high surface resistivity in the presence of cesium, attempts were made to utilize a ceramic which would have a non-porous surface and would not be wet by cesium. When applying such glazes to an alumina body, for example, temperature requirements of about 1000° C. are necessary in order to seal the metal to the ceramic in the presence of a molten glaze. However, at this temperature and, especially in the presence of vacuum or hydrogen, the glaze bubbled or frothed thus leaving a large part of the ceramic surface unprotected. It has also been discovered that certain ranges of constituents in a glass provide one which will not bubble or froth. Examples of specific glasses taken from the aforementioned system which will provide the desired results are indicated in the following table:

*Table I*

[Percentage by weight]

| | A | B | C |
|---|---|---|---|
| BaO ................................................percent.. | 35 | 30 | 30 |
| $Al_2O_3$ ...........................................do..... | 10 | 20 | 10 |
| $SiO_2$ .............................................do..... | 37 | 40 | 50 |
| $B_2O_3$ ............................................do..... | 18 | 10 | 10 |

Class C is a preferred composition in cesium tube seals. These glasses have a maturing temperature from about 1300°–1450° C. and above and have been matured in hydrogen at 1550° C. They also have been found to undergo reheating without bubbling or frothing in vacuum at about 1000° C. and in hydrogen at about 1250° C. A typical glass composition is given in the following table:

*Table II*

| | |
|---|---|
| BaO 30% by weight | Barium carbonate 78 parts by weight. |
| $Al_2O_3$ 10% by weight | Alumina hydrate 31 parts by weight. |
| $SiO_2$ 50% by weight | Silica sand or powdered flint 100 parts by weight. |
| $B_2O_3$ 10% by weight | Boric acid 36 parts by weight. |

The glass base composition as given above may be varied over a wide range and yet retain the desired characteristics, for example, good thermal correlation to the base or covering surface. This thermal correlation refers to the difference in the thermal expansion and moduli of elasticity of the glass as compared to the covering surface. The difference need not be minute, but sufficient so that the glass will bond but not spall, craze or crack, and tolerate the normal thermal shock encountered in service. Best results are obtained when the glass base has a lower thermal coefficient of expansion than the alumina ceramic or other base surface. In this respect, the glaze will be in compression at lower temperatures, thereby strengthening the composite structure. In comparison, the glass base as given has a linear thermal expansion coefficient of about $5.4 \times 10^{-6}$ centimeters per centimeter per degree C., over the range 25°–300° C. compared to about $8.5 \times 10^{-6}$ centimeters per centimeter per degree C for most alumina ceramics.

The glass base should also be high in flow temperatures, so that the glass will not flow under high service temperatures. The glass as given has a standard fiber-softening temperature of about 858° C., compared to 820° C. for borosilicate laboratory ware glass, and 696° C. for ordinary soda lime glass. It remains highly viscous over a wide temperature range which permits firing on alumina ceramic bodies at 1250°–1450° C. without destruction by volatilization or by seepage into the base surface. The electrical resistivity at service temperatures of 500° or 600° C. should be sufficiently high so as not to invalidate the electrical resistivity properties sought. The glass should furthermore have good chemical properties to resist attack by gases and other corrosive agents encountered in service.

These desirable characteristics are retained in glass compositions varying over the range given in the following table:

*Table III*

|  | Percent by weight |
|---|---|
| BaO | 25–45 |
| $Al_2O_3$ | 10–20 |
| $SiO_2$ | 30–50 |
| $B_2O_3$ | 10–20 |

The examples as given in Tables I and III have the particular advantage of permitting firing on alumina bodies above 1500° C., and also permit a single-fire application with alumina bodies. The glass bases as heretofore explained and described are further capable of several inclusions and exclusions. The BaO may be partially replaced by other alkaline earth oxides or combinations, including, for example, SrO, CaO, MgO and BeO.

Preparation of a suitable glass base includes melting the components in a crucible of, for example, platinum or ceramic, at a temperature between 1550° and 1600° C. Thereafter, the melt is quenched, either in water or in air, and crushed, ground, or otherwise reduced, for example in a ball mill or a like apparatus, sufficient to pass through a 150-mesh screen. The glass base as described is mixed with a suitable quantity of water or water and alcohol to form a slip-type mixture.

The slip mixture thus prepared may be applied to, for example, an alumina ceramic by the well known methods in the glazing art, such as by dipping, brushing, or spraying. After the slip is applied to the alumina ceramic object, it is fired to maturity in an air atmosphere by rapidly heating to a temperature between approximately 1275° and 1350° C. and maintaining the temperature for about 3 to 5 minutes. Single objects can be cooled rapidly to room temperature. The measured thickness of this coating preferably ranges between 3–6 mils. It has been found feasible to carry out the firing in either intermittent or continuous furnaces on a much slower schedule. For example, several objects may be placed in a cold furnace after which the temperature is increased to 1350° C. over a period of 24 hours, cooled quickly to about 1000° C. and then cooled to room temperature at the natural rate of the furnace. As a seal, this glass may be employed in vacuum or gas filled tube structures to provide an excellent metal to glass seal. Various seals have been made in accordance with the teachings of this invention to bond refractory metals, for example, molybdenum, tungsten, niobium, tantalum, etc., and alloys of these and other metals.

By way of example, a simplified description of one form of this invention is given in connection with FIG. 1. In FIG. 1, a metal conductor 10 passes through a glass or ceramic 11. It may be practical in many instances to provide a metal conductor already sealed to a glass, ceramic, etc., where no substantial problems may arise in sealing, bonding or otherwise attaching the glass or ceramic 11 to another object. Whether this is desirable or not, the sealing operation is generally the same. The seal becomes a wetting glass 12 which fills the volume between the metal conductor and the glass or ceramic and is fired to maturity as previously described. Build-up of seal may be provided at the top and bottom surfaces 13 and 14, if desired, particularly where glass or ceramic member 11 is relatively thin.

Since the glass seal of this invention has the property of being tightly adherent to the mentioned metals, it may also be employed as a protective coating thereon.

It is thus understood that the objects of my invention are obtained by the use of a range of glasses, from the $BaO-Al_2O_3-SiO_2$ ternary system with added $B_2O_3$ for a seal or coating, and which has thermal expansion characteristics closely matching the refractory metals, such as tantalum, molybdenum, niobium or tungsten.

While the present invention has been described with reference to particular embodiments thereof, it will be understood that numerous modifications may be made by those skilled in the art without departing from the scope of this invention. Therefore, I aim in the appended claims to cover all such equivalent variations and modifications as come within the true spirit and scope of the foregoing disclosure.

What I claim as new and desire to secure by Letters Patent of the United States is:

1. A method of providing a metal to ceramic seal which comprises providing a mixture consisting essentially of about 25–45% BaO, 10–20% $Al_2O_3$, 30–50% $SiO_2$, and 10–20% $B_2O_3$, the percentages being by weight, applying said mixture between the metal and the ceramic in a metal ceramic joint, and firing the mixture to maturity.

2. The invention as claimed in claim 1 wherein said metal is taken from the class consisting essentially of tungsten, molybdenum, tantalum, niobium and alloys containing these metals.

3. The invention as recited in claim 1 wherein said ceramic is alumina.

4. A method of providing a metal-to-ceramic seal comprising melting about 30% BaO, 10% $Al_2O_3$, 50% $SiO_2$ and 10% $B_2O_3$, the percentages being by weight, reducing the solidified melt to small particle size, forming a slip mixture of the particles, applying the slip mixture between the metal and the ceramic in a metal ceramic joint, and firing the slip to maturity.

5. As an article of manufactures a presealed met ceramic object comprising in combination a ceramic object, a metal member in contact with said object, and glass seal between said ceramic object and said metal member sealing said metal member to said ceramic object, said glass seal taken from the $BaO-Al_2O_3-SiO_2$ ternary system with 10–20% $B_2O_3$ added, the percentages being by weight.

6. The invention as recited in claim 5 wherein the composition of said glass is 25–45% BaO, 10–20% $Al_2O_3$, 30–50% $SiO_3$ and 10–20% $B_2O_3$, the percentages being by weight.

7. The invention as recited in claim 5 wherein said metal member is a refractory metal taken from the class consisting essentially of molybdenum, tantalum, columbium, tungsten and alloys containing these metals.

8. The invention as claimed in claim 5 wherein the composition of said glass is essentially 30% BaO, 10% $Al_2O_3$, 50% $SiO_2$ and 10% $B_2O_3$, the percentages being by weight.

References Cited by the Examiner
UNITED STATES PATENTS

| | | | |
|---|---|---|---|
| 394,910 | 12/88 | Butler | 117—125 |
| 1,154,081 | 9/15 | Weintraub | 189—36.5 |
| 2,161,824 | 6/39 | Krefft et al. | 106—54 |
| 2,389,386 | 11/45 | Russell | 117—125 |
| 2,475,469 | 7/49 | Bennett et al. | 117—129 |
| 2,495,836 | 1/50 | Comstock et al. | 117—129 |
| 2,541,842 | 2/51 | Teare | 106—54 |
| 2,560,593 | 7/51 | Pask et al. | 65—43 |
| 2,784,532 | 3/57 | Griffiths | 65—59 |
| 2,877,124 | 3/59 | Welsch | 106—54 |
| 2,929,728 | 3/60 | Foraker | 106—54 |

DONALL H. SYLVESTER, *Primary Examiner.*

CHARLES R. HODGES, ARTHUR P. KENT, MORRIS O. WOLK, *Examiners.*